315-366 AU 222 EX
4/30/85 OF RE 31,876

United States Patent [19]
Watanabe et al.

[11] E Patent Number: Re. 31,876
[45] Reissued Date of Patent: Apr. 30, 1985

[54] PICTURE DISPLAY DEVICE

[75] Inventors: Masanori Watanabe, Katano; Kinzo Nonomura, Hirakata; Yoshinobu Takesako, Neyagawa, all of Japan

[73] Assignee: Matsushita Electric Industrial Co., Ltd., Osaka, Japan

[21] Appl. No.: 433,023

[22] Filed: Oct. 5, 1982

Related U.S. Patent Documents

Reissue of:
[64] Patent No.: 4,227,117
Issued: Oct. 7, 1980
Appl. No.: 32,752
Filed: Apr. 24, 1979

[30] Foreign Application Priority Data

| | | | |
|---|---|---|---|
| Apr. 28, 1978 | [JP] | Japan | 53/51808 |
| Apr. 28, 1978 | [JP] | Japan | 53/51810 |
| Aug. 30, 1978 | [JP] | Japan | 53/106788 |

[51] Int. Cl.[3] ..... H01J 29/70; H01J 29/72
[52] U.S. Cl. ..... 315/366; 313/422
[58] Field of Search ..... 315/366; 313/422

[56] References Cited

U.S. PATENT DOCUMENTS

| | | | |
|---|---|---|---|
| 2,965,801 | 12/1960 | Archer et al. | 315/366 |
| 3,935,500 | 1/1976 | Oess et al. | 313/422 |
| 4,029,984 | 6/1977 | Endriz | 313/422 |
| 4,118,651 | 10/1978 | Scott | 315/366 |
| 4,137,486 | 1/1979 | Schwarz | 315/366 |

*Primary Examiner*—Theodore M. Blum
*Attorney, Agent, or Firm*—Stevens, Davis, Miller & Mosher

[57] ABSTRACT

A picture display device comprising an electron source for producing band-shaped electron beams, electron beam control means for controlling the selective passage of the electron beams, deflection means for horizontally and vertically deflecting the electron beams and display means for emitting light in response to impingement of the electron beams thereon. The electron source comprises a plurality of linear thermionic cathodes, a focusing electrode for focusing the electron beams emitted from each linear thermionic cathode to band-shaped electron beams and an electron beam emitting electrode having a plurality of apertures therethrough, and a negative pulse voltage is sequentially applied to the linear thermionic cathodes to emit the required electron beams for one scanning line.

19 Claims, 10 Drawing Figures

PICTURE DISPLAY DEVICE

Matter enclosed in heavy brackets [ ] appears in the original patent but forms no part of this reissue specification; matter printed in italics indicates the additions made by reissue.

BACKGROUND OF THE INVENTION

The present invention relates to a picture display device and more particularly the invention relates to a flat plate display device in which the electron beams emitted from a plurality of linear thermionic cathodes are controlled by a plurality of electron beam control electrodes so as to focus, deflect, accelerate and then impinge the electron beams on a fluorescent screen and thereby to display a picture on the screen with a high degree of resolution.

Conventionally, matrix type flat plate display devices of the types employing EL, plasma, liquid crystal, etc., have been developed and these devices have been insufficient in their performance with respect to brightness, light emitting efficiency, color display, etc., thus failing to reach the stage of use in practical applications such as the display of pictures, e.g., TV actions.

On the other hand, attempts to provide flat plate display devices of the type using electron beams have been reported. In other words, a device of this type is designed such that the electron beams emitted from an electron source are controlled by a matrix of flat plate electron beam control electrodes to display characters or a picture.

In U.S. Pat. No. 3,678,330 a display device is disclosed in which electron beams are emitted from a flat plate electron source and a plurality of electron beam control electrode plates each having electrodes arranged in a comblike manner are placed one upon another, whereby the passage of the electron beams is controlled and the beams are accelerated to illuminate a display plate coated with a fluorescent substance and thereby to display characters or a picture on the display plate. A disadvantage of this display device is that it is difficult to obtain a high-current-density flat plate electron source capable of ensuring a uniform current density over the entire display screen.

Generally, with the above type of display device or so-called matrix type display device, the resolution of the picture is dependent on the size and pitch of the apertures provided through the electron beam control electrodes or the base plates of the electrodes. Therefore, it is necessary to reduce the size and pitch of the apertures to produce a picture having a high degree of resolution as well as the sharp detail. When it is intended to produce a sharp picture of a certain size, it is necessary to form the apertures with a greater density and also to greatly increase the number of the apertures as well as the number of the electrodes. For instance, in order to make a display of a picture by television, the mimimum number of the required apertures must be $500 \times 750$ and the electron beam control electrode plates must be provided with 500 horizontal electrodes and 750 vertical electrodes. Moreover, in order to display a color picture, it is necessary to increase by three times the number of the apertures as well as the number of the electrodes.

With the presently available materials and processing techniques, the maximum limit of the number of electrodes has been considered about 2 to 3 per millimeter, thus failing to ensure a satisfactory resolution. Increasing the number of apertures and the number of electrodes greatly increases the number of drive circuits for driving the electrodes and the number of connections between the drive circuits and the electrodes, thus giving rise to serious mounting or packaging problems.

In an attempt to overcome the foregoing deficiencies, a method is disclosed in U.S. Pat. No. 3,935,500 in which the electron beams are controlled by a pair of matrices of electrodes and the electron beams are vertically and horizontally deflected by deflection electrodes. In U.S. Patent, a thermonic cathode is provided for each of the apertures formed in the matrices of electrodes thus giving rise to a serious practical disadvantage that a very large power is required for heating purposes and there are variations in the amount of emitted electron flow among the cathodes.

SUMMARY OF THE INVENTION

It is an object of the invention to provide an improved flat plate picture display device which overcomes the foregoing deficiencies, is capable of producing a picture with high brightness and good resolution and ensuring highly uniform brightness, is capable of being assembled with ease and is useful industrially.

In accordance with the invention there is thus provided a picture display device comprising an electron source for producing band-shaped electron beams, electron beam control means for controlling selective passage of the electron beams, deflection means for horizontally and vertically deflecting the electron beams and display means for emitting light in response to impingement of the electron beams thereon, the electron source comprising a plurality of linear thermionic cathodes, a focussing electrode for focussing the electron beam emitted from each of the linear thermionic cathodes into a band form and an electron beam emitting electrode having a plurality of apertures therethrough, whereby a negative pulse voltage is sequentially applied to the linear thermionic cathodes to produce the required electron beams for each scanning line.

Thus the display device of the invention has among its great advantages the fact that it is capable of producing a picture having high brightness and good resolution and that the number of the electrodes used is decreased greatly as compared with the prior art devices with the resulting simplification of the drive circuits, reduction in the cost, simplification in the mounting of the components and reduction in the number of the connecting terminals with the resulting reduction in the number of faults.

DESCRIPTION OF THE PREFERRED EMBODIMENT

Figure 1:
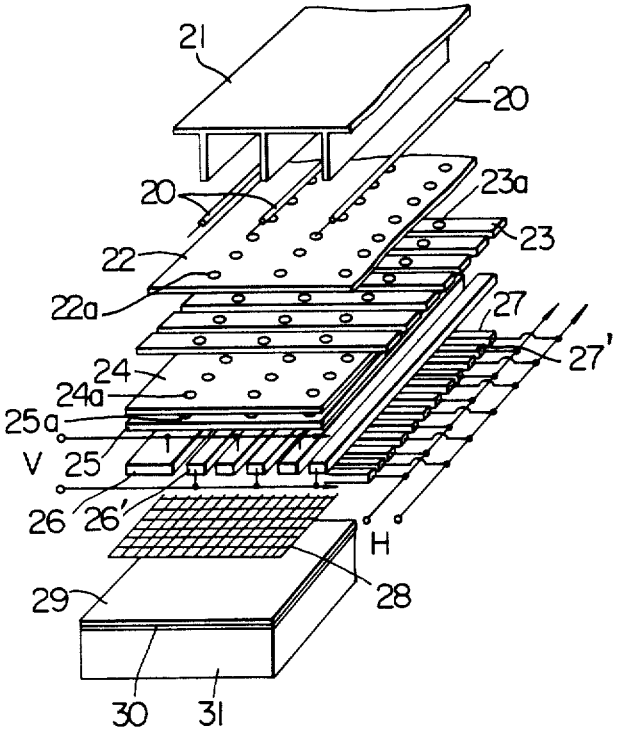
FIG. 1 is an exploded perspective view showing the principal parts of a display device according to an embodiment of the invention.

Referring to FIG. 1, there is illustrated an exploded partial schematic diagram showing the basic construction of a flat plate picture display device according to the invention. In the Figure, numeral 20 designates linear thermionic cathodes which are each comprised of a tungsten wire of 10 to 20 $\mu\phi$ which is coated with an oxide cathode material. Numeral 21 designates a C— or U-shaped partition electrode disposed to enclose the linear thermionic cathodes except the front side thereof, and it is positioned opposite to an electrode 22 for emitting electron beams so as to allow a high density electron beam to flow into apertures 22a which are formed in the electrode 22. The rows of apertures 22a through the electron beam extraction electrode 22 are each arranged to extend parallel and opposite to each of the linear thermionic cathodes 20 respectively.

Numeral 23 designates a plurality of electrodes in strip form which are formed with apertures 23a each being coaxial with corresponding one of the apertures 22a formed in the electrode 22. Electrodes 24 and 25 are provided for electron beam forming purposes and they are respectively formed with apertures 24a and 25a which are coaxial with the apertures 22a and 23a which are respectively formed in the electrodes 22 and 23. Each of electrodes 26 forms a pair with associated one of electrodes 26' to provide electrodes for vertical deflection purposes. In the like manner, electrodes 27 and 27' form electrodes for horizontal deflection purposes. Electrodes 28 which are in linear or ribbon form have the same pitch as the partition plates provided on the partition electrode 21 and their function is to ensure accurate vertical deflection. Numeral 31 designates a transparent glass base whose surface is coated with a fluorescent layer 30 which emits light in response to impingement of electron beams thereon, and a thin aluminum coating 29 is deposited by evaporation on the surface of the fluorescent layer 30 to provide an acceleration electrode as well as a display screen.

With this basic construction of the flat plate picture display device, the operation of the individual electrode means will now be described in detail on the basis of the results obtained by embodying the invention in a display device having a 5-inch display screen.

CATHODE STRUCTURE

Figure 2:
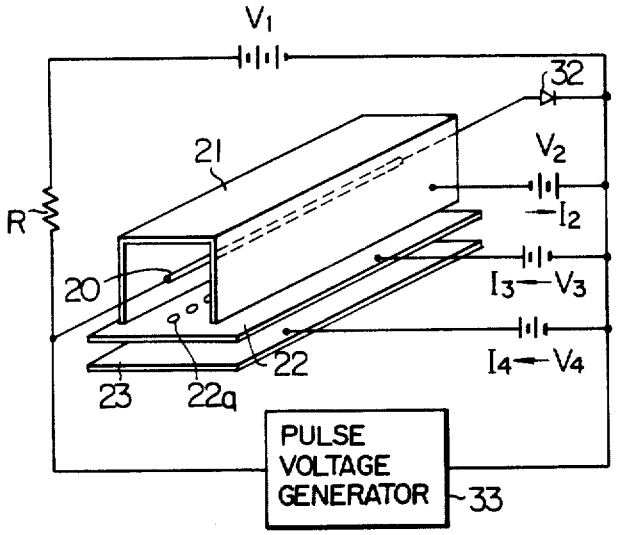
FIG. 2 is a connection diagram for the device of the invention in which the electron source is driven with pulses.

FIG. 2 shows the arrangement of the components associated with and provided near one of the linear thermionic cathodes 20 shown in FIG. 1. The linear thermionic cathodes 20, the partition electrode 21 and the electron beam extraction electrode 22 constitute a cathode structure. The linear thermionic cathode 20 comprises a tungsten wire of 20 $\mu\phi$ and a triple carbonate cathode material (Ba, Sr, Ca) $CO_3$ deposited by electrodeposition on the tungsten wire to 5 to 20$\mu$ thick, and 15 linear thermionic cathodes 20 are horizontally stretched at intervals of 5.08 mm so that each of the linear thermionic cathodes 20 irradiates one fifteenth of the display screen with an electron beam and the entire display screen is irradiated by the electron beams from the 15 linear thermionic cathodes 20. Each of the linear thermionic cathodes 20 must be extended in such a manner that a proper tension is applied to prevent the thermionic cathode 20 from being slackened when it is brought into operation. The linear thermionic cathode 20 is stretched to extend through about the central portion of the C- or U-shaped cylindrical partition electrode 21 and consequently a plate-like electron beams are produced by a focussing field provided by the partition electrode 21 and the electron beam extraction electode 22. In addition to the above-mentioned form, the partition electrode 21 may be formed with parallel flat plates and it serves as a rear electrode for the linear thermionic cathode 20.

The electron beam extraction electrode 22 consists of a metallic conductive plate and it is formed with 81 apertures 22a each having a diameter of 0.8 $\phi$ and arranged at a pitch of 1.27 mm in correspondence with the linear thermionic cathodes 20.

FIG. 2 also shows a connection diagram for the cathode structure used with the invention. The cathode structure shown in FIG. 2 is designed to produce an electron beam which is uniform and has a high current density. One end of the linear thermionic cathode 20 is connected to the positive terminal of a power source $V_1$ through a resistor R. The other end of the linear thermionic cathode 20 is connected to the negative terminal of the power source $V_1$ through a diode 32. Numeral 33 designates a negative pulse voltage generator. A power source $V_2$ applies a negative voltage to the cylindrical electrode or partition electrode 21, and power sources $V_3$ and $V_4$ respectively apply a positive voltage of the electrodes 22 and 23.

When a power is supplied to the linear thermionic cathode 20 by the power source $V_1$, while this places the thermionic cathode 20 in condition to emit electrons, the thermionic cathode 20 in fact emits no electron due to the fact that the negative voltage is applied to the cylindrical partition electrode 21, although the positive voltage is applied to the electrode 22. In other words, it may be considered that a negative bias voltage is applied to the electrode 21 to prevent the emission of electrons from it. In this condition, when a negative pulse voltage is applied to the end of the thermionic cathode 20 from the pulse voltage generator 33, the linear thermionic cathode 20 is made negative and the emission of electrons is caused. When this occurs, the voltage is applied in the opposite direction to the diode 32 connected to the other end of the linear thermionic cathode 20, so that the potential difference between the ends of the thermionic cathode 20 is reduced practically to zero and the axial potential gradient is reduced to zero. Consequently, an electron beam is produced which is uniform and having a high current density.

Figure 3:
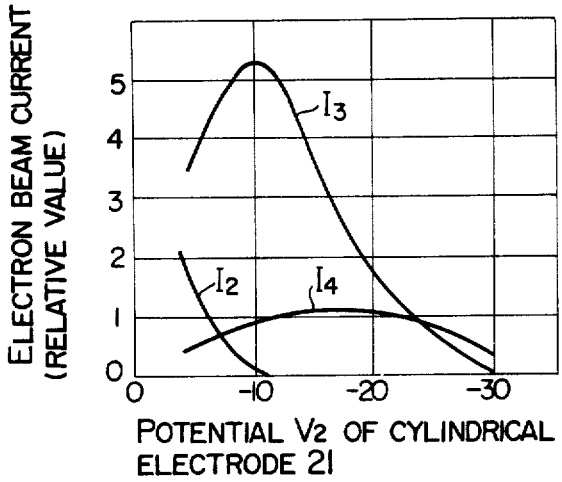
FIG. 3 is a graph showing variation of the electron beam current flowing to the respective electrodes when the electron source is driven with pulses.

FIG. 3 shows the measured values of the electron beam currents supplied to the electrodes with the connections shown in FIG. 2. Designated at $I_2$, $I_3$ and $I_4$ are the electron beam currents respectively supplied to the electrodes 21, 22 and 23. The measured values indicate those obtained by varying the bias voltage of the cylindrical electrode 21 with the power source voltage $V_3$ of +20 V, another power source voltage $V_4$ of +60 V and the pulse voltage of −20 V. The cylindrical electrode 21 has a cross-sectional area of 5×5.08 mm, for example, and the measurements were made by stretching and fixing the linear thermionic cathode 20 in place in the central portion of the cylindrical electrode 21.

As will be seen from FIG. 3, when the voltage applied to the cylindrical electrode 21 is set below about −11 V, the current ceases to flow to the electrode 21. Thus the entire current flows to the electrode 22, and a part of the current passes through the apertures 22a (the effective area was 8% of the electrode 22) and it is then supplied to the acceleration electrode 23. It will be seen that when the potential of the power source $V_2$ is −10 V, −20 V and −30 V, respectively, the ratio of the current passing through apertures $I_4$ to the total current becomes 13, 35 and 59%, respectively and thus, the relative current density at the aperture portion is increased by 1.6, 4.3 and 7.4 times, respectively. This is caused by that the electrodes 21, 22 and 23 constituting the cathode structure provide a bell-shaped equipotential surface with the linear thermionic cathode 20 forming the apex and thus the electron beam is focussed into a plate form or into the shape of a plate on the aperture 22a portion.

Figure 4A:
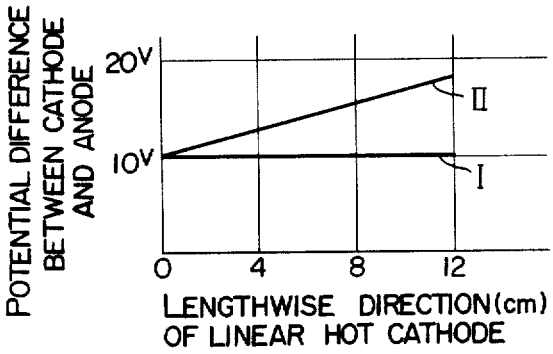
FIGS. 4a and 4b are comparative diagrams showing respectively the relationship between the potential difference and electron beam current and the lengthwise direction of the linear thermionic cathodes in the electron source of the invention.
Figure 4B:
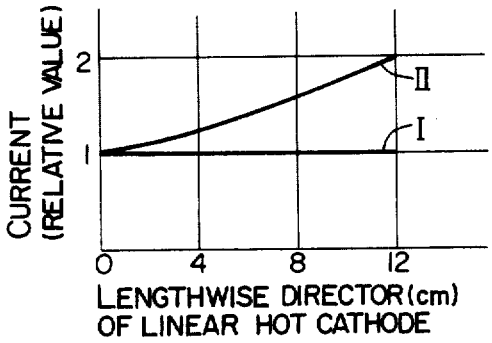

The improved uniformity and density of the electron beam produced by the electron source of FIG. 2 will now be described with reference to FIGS. 4 and 5. FIG. 4 shows a comparison of the uniformity of the electron beam emission effected according to the invention and that according to the prior art method when 6 V cathode heating voltage is applied to the thermionic cathode 20 of 12 cm long and a voltage of +10 V is applied to the opposing electrode or electron beam extraction electrode 22. FIGS. 4a and 4b respectively show the potential difference and the relative value of electron beam current at different positions in the lengthwise direction of the linear thermionic cathode 20. The curves I represent the values according to the invention and the curves II represent the values according to the prior art method. As will be seen from these Figures, when an electron beam is emitted by simply applying a predetermined voltage to one end of a thermionic cathode as is the usual practice in the prior art, the intensity (density) of the emitted electron beam differs greatly from point to point in the lengthwise direction of the cathode. On the contrary, by applying a pulse voltage to one end of a thermionic cathode through a diode and thereby reducing practically to zero the potential difference between the ends of the thermionic cathode as in the case of the invention, it is possible to produce a very uniform electron beam.

Figure 5:
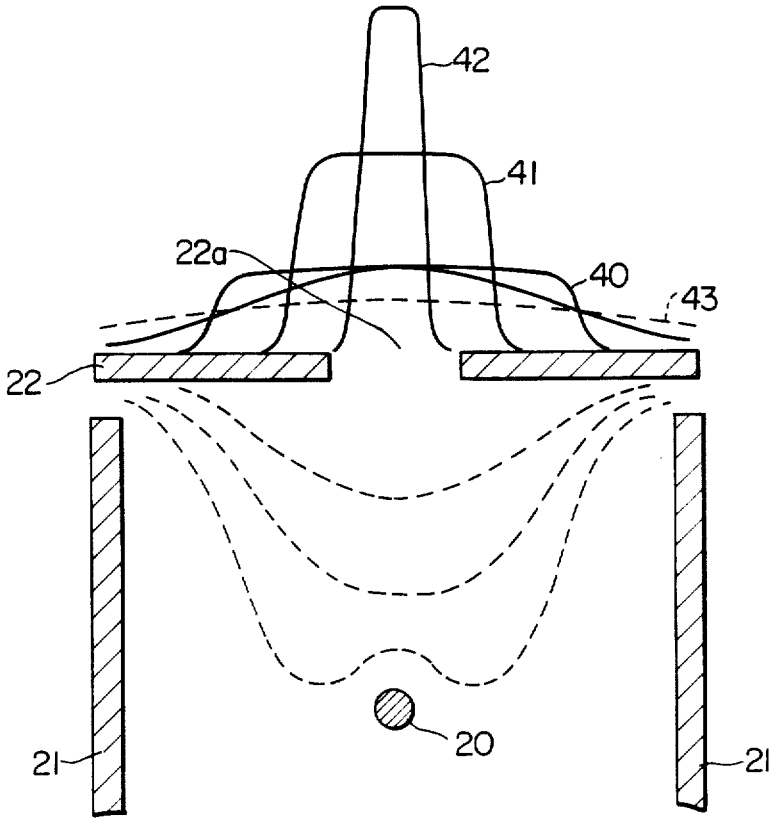
FIG. 5 is a diagram showing the distribution of the electron beam currents in the electron source of the invention.

FIG. 5 shows the experimental results on the electron beam density of the electron source shown in FIG. 2. The curves 40, 41 and 42 show the distributions of the electron beams supplied to the electrode 23 when varying the voltage applied to the cylindrical partition electrode 21. The curves 40, 41 and 42 respectively show the distributions obtained by applying −10 V, −20 V and −30 V to the electrode 21. As will be readily seen from FIG. 5, the electron beam distribution concentrates in the central portion as the voltage applied to the electrode 21 is made increasingly negative. This is due to the fact that the equipotential surface within the cylindrical electrode 21 forms a bell-shaped focussing electric field (broken line) in the direction of the central portion. As a result, the relative density of the electron beam current passed through the apertures 22a formed in the opposing electrode 22 is increased by 1.6, 3.4 and 7.4 times than those obtained without the cylindrical electrode 21 as mentioned previously.

In other words, in FIG. 5 the broken line 43 indicates the distribution of the electron beam emitted without the provision of the electrode 21 as in the case of the prior art method. In accordance with the invention, while the total value of the electron beam current is the same as one in prior art, as will be seen from the curves 40, 41 and 42 in the Figure, the density of the electron beam transmitted through the aperture 22a portion is increased greatly by virtue of the focussing field effect of the cylindrical electrode 21 and moreover the electron beam is introduced into the apertures 22a of the electrode 22 substantially at right angles, thus making the device of the invention best suited for ensuring improved resolution.

CONTROL ELECTRODE STRUCTURE

The electrode plate 22 for extracting electron beam, the group of strip electrode plates 23 and the lattice electrode plate 24 constitute an electron beam control electrode structure. The strip electrode plates 23 are insulated from one another and 81 of the electrode plates 23 are arranged at intervals of 1.27 mm to cross the 15 linear thermionic cathodes 20 at right angles. The strip electrode plates 23 and the lattice electrode plate 24 respectively include the apertures 23a and 24a which are formed coaxial with the apertures 22a formed in the electrode plate 22. The apertures having diameters of 0.8 and 0.6 mmϕ were used. The spacing between the electrode plates should be preferably as small as possible. Usually the spacing is kept in the range of 0.3 to 0.5 mm. The strip electrode plates 23 are connected to a picture signal circuit (FIG. 7) so that a picture signal for one scanning line is sequentially applied to the strip electrode plates 23. A bias voltage is applied to each of the strip electrode plates 23 to cut off the electron beam and the amount of the electron beam passing through the apertures is controlled by applying a positive picture signal to the strip electrode plates 23. In other words, the electrode plates 23 perform a switching action. When a picture signal is applied to the strip electrodes 23, the switching action and the focusing quality of the transmitted electron beam will be changed by the potential of the adjoining electrodes, therefore, the spacing between the previously mentioned three electrodes must be reduced so as to prevent such mutual actions. The experiments conducted have shown that the effect of the potential of the adjoining electrodes can be made negligibly small by selecting the spacing between the three electrodes 22, 23 and 24 smaller than the spacing between the apertures.

ELECTRON BEAM FOCUSING STRUCTURE

The latice electrodes 24 and 25 constitute an electron beam focusing structure. The lattice electrode 25 is substantially identical in construction with the lattice electrode 24. The electron beam is collimated by these electrodes or the electron beam is focussed by the applied potential difference between the electrodes. On the other hand, by inserting a further electrode plate (not shown) between the electrodes, it is possible to form an Einzel lens system. In either case, in order that the electron beam may be focussed to the required beam diameter on the display surface 30, the voltages applied to the lattice electrodes 24 and 25 must be selected suitably and at the same time the voltages applied to the individual electrodes in the cathode structure and the electron beam control structure must be selected suitably. The voltage applied to the lattice electrode 25 determines the energy of the electron beam incident to the following electron beam deflection electrodes and consequently a suitable voltage must be applied depending on the amount of vertical and horizontal deflection of the electron beam.

ELECTRON BEAM DEFLECTION STRUCTURE

Figure 6:
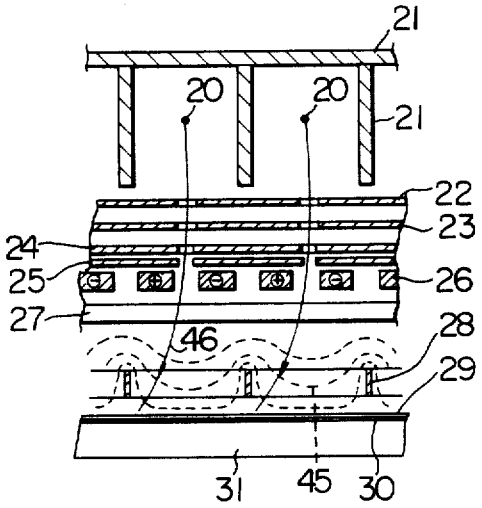
FIG. 6 is a schematic diagram useful for explaining the deflecting action of the ribbon electrodes on the electron beams.

An electron beam deflection structure comprises, for example, 15 pairs of the vertical deflection electrodes 26 and 26' and 81 pairs of the horizontal deflection electrodes 27 and 27'. The 15 pairs of the vertical deflection electrodes are alternately connected so that a step form wave deflection voltage with 16 steps is simultaneously applied to the 15 pairs. In the like manner, the 81 pairs of the horizontal deflection electrodes are alternately connected so that a step form wave deflection voltage with 3 steps is simultaneously applied to the 81 pairs. As a result, a picture having 240×243 picture elements can be produced on the picture display screen. As will be readily understood, by applying the step form wave deflection voltage with n steps and the step form wave deflection voltage with m steps to the vertical and horizontal deflection electrodes, respectively, it is possible to produce 15n×81m picture elements. The ribbon-like electrodes 28 forms a pair with the metal backed electrode 29 formed on the surface of the display plate 31, thus forming an electron beam acceleration electrode. The ribbon-like electrodes 28 are provided in the acceleration space between the deflection electrodes 27 and 27' and the display plate 31, and as shown in the sectional view of FIG. 6, when a high electric field is applied to the ribbon-like electrodes 28, an electric field is produced which diverges against the electron beam so that the amount of deflection is facilitated in cases where the electron beam must be deflected considerably and this is extremely effective in cases where it is desired to produce continuous pictures on the display screen. In FIG. 6, numeral 45 designates an equipotential surface and numeral 46 the paths of the deflected electron beams.

The ribbon-like electrodes 28 may each be replaced with a linear electrode which is stretched in the same position to obtain the similar effect.

With the device of the invention, in the case of a dot matrix display such as character display, the display can be effected simply through the selection of the apertures in the electron beam extraction electrode and consequently the deflection in the axial direction of the linear thermionic cathodes 20 or the horizontal deflection can be effected without the electrodes 27.

With the above-described deflection electrode system it is possible to produce a uniform and bright picture over the entire display screen by deflecting the electron beams ±2.54 mm in the vertical direction and ±0.635 mm in the horizontal direction.

When the voltages shown in the following Table 1 are applied to the electrodes of the above-described picture display device, the full screen scanning with the electron beam current of 100 μA for one scanning line, the beam diameter of 0.2 mmϕ and the acceleration voltage of 5 to 10 KV resulted in a surface brightness of 50 to 150 fL.

TABLE 1

| | |
|---|---|
| Vertical drive pulse voltage | −13 V |
| Partition electrode plate (21) voltage | −10 V |

TABLE 1-continued

| | |
|---|---|
| Beam extraction electrode (22) voltage | 10 V |
| Horizontal drive pulse voltage | 20 V |
| Focussing electrode (24) voltage | 30 V |
| Focussing electrode (25) voltage | 180 V |
| Vertical deflection voltage | P-P 150 V |
| Horizontal deflection voltage | P-P 70 V |
| Lattice electrode (28) voltage | 200 V |
| Acceleration electrode (29) voltage | 10 V |

DRIVE SYSTEM

Figure 7:
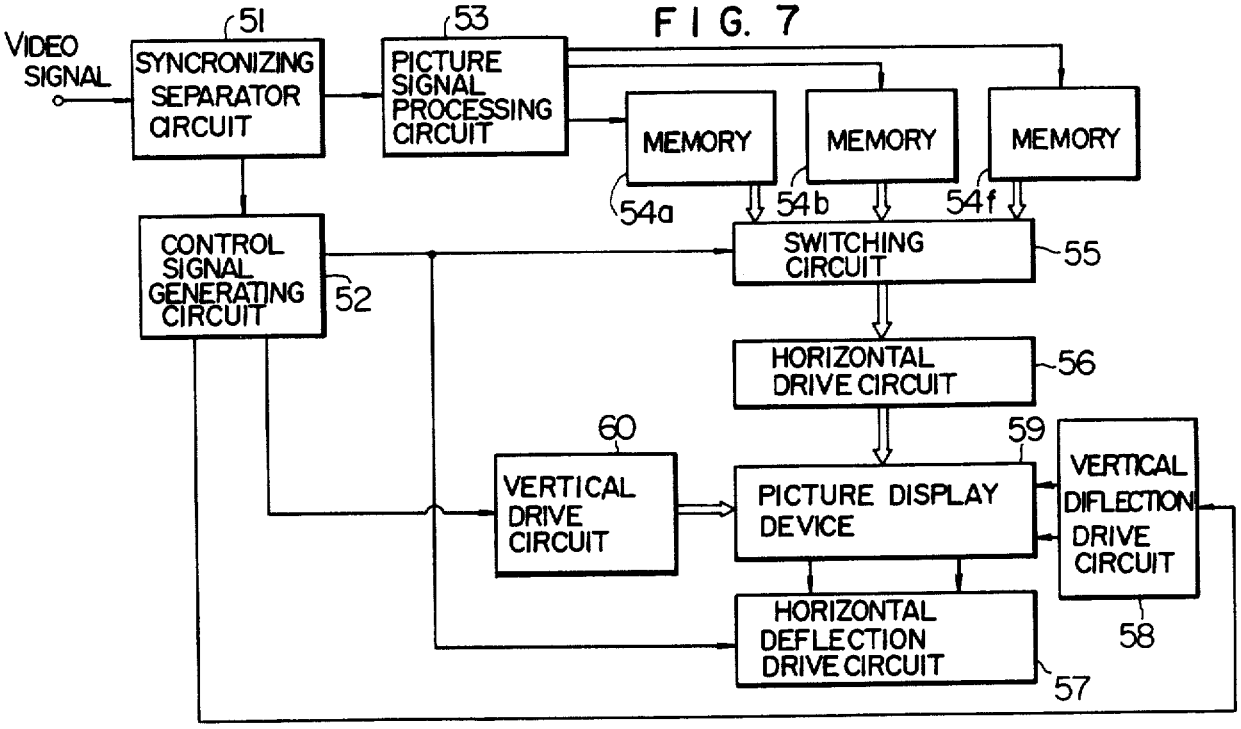
FIG. 7 is a block circuit diagram useful for explaining the drive system of the display device of the invention used for displaying television pictures.

The picture display device of the invention can be most advantageously be used as a TV picture display device. The device will now be described with reference to a case where the device is used as a TV picture display device FIG. 7 shows a block diagram of a drive system used with this embodiment for displaying TV pictures. In this embodiment, the number of vertical electron beam control electrodes (linear thermionic cathodes) is 15 and the number of horizontal electron beam control electrodes (strip electrodes) is 81. The display system is a single-scanning-line simultaneous display system which is generally used with the matrix type display devices. As mentioned previously, the device further comprises vertical and horizontal deflection electrodes which are respectively corresponding to the vertical and horizontal electron beam control electrodes.

In the Figure, when a video signal is applied to a synchronizing separator circuit 51, the video signal is applied to a control signal generating circuit 52 and a picture signal processing circuit 53. In the picture signal processing circuit 53 the picture signal for one horizontal scanning line is divided into a series of 486 signals so that the signals are sequentially stored in the associated memories, that is, the 1st, 7th, 13th, . . . , 481st signals are stored in a memory 54a, the 2nd, 8th, 14th, . . ., 482nd signals into a memory 54b, . . . , and the 6th, 12th, 18th, . . . , 486th signals into a memory 54f. The picture signals stored in the memories are fed sequentially to a horizontal drive circuit 56 through a switching circuit 55 in synchronism with the signals from the control signal generating circuit 52 and the picture signal voltages are applied to the 81 horizontal electron beam control electrodes 23. If the scanning time of one horizontal scanning line is 63 μs as in the case of the ordinary TV picture display, the signal voltages from the memories will be sequentially applied for the duration of 1/6th of one horizontal scanning time or 10.5 μs at each time.

Figure 8A:
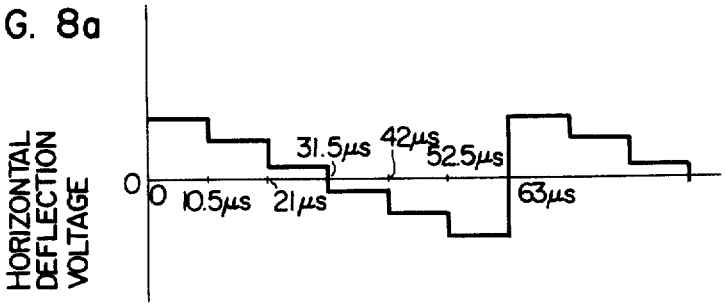
FIGS. 8a and 8b illustrate respectively the variation of the horizontal and vertical deflection waveforms with reference to time.

On the other hand, one of the signals generated from the control signal generating circuit 52 is applied to a horizontal deflection drive circuit 57 and consequently a deflection voltage such as one shown in FIG. 8a is simultaneously applied to the 81 pairs of horizontal deflection electrodes 27. As a result, a voltage is applied so that as for example, looking in the display plate surface, the beam is deflected to the left a maximum of 0.635 mm during the initial 10.5 μs period, during the next 10.5 μs period the beam is deflected to the right 0.425 mm successively and the beam is deflected to the right a maximum of 0.635 mm during the sixth 10.5 μs period. The timing of this deflection is effected in synchronism with the switching circuit 55.

Figure 8B:
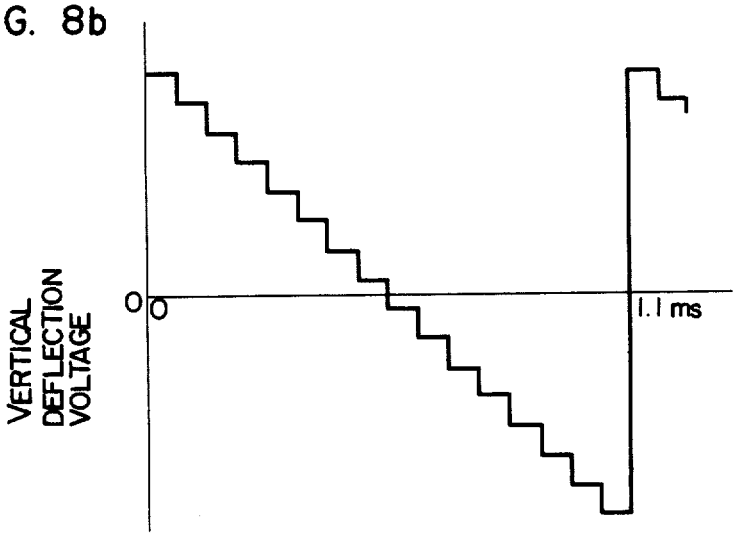

Next, the vertical scanning will be described. In the case of the ordinary TV picture display, a signal voltage must be applied sequentially from the top to the bottom, one for every 63 μs. If the number of vertical scanning lines is 480, initially a negative signal of about 1.1 ms or 1/15th of one frame time of 16.6 ms is applied through a vertical drive circuit 60 to the first or, e.g., the uppermost linear thermionic cathode 20 and in synchronization a 16-step vertical deflection voltage, such as one shown in FIG. 8b, is applied to the vertical deflection electrodes 28. As for example, the beam is deflected upward 2.54 mm during the first 63 μs, during the next 63 μs period the beam is deflected 2.202 mm, during the following periods the beam is deflected downward 5.08/15 mm successively and the beam is deflected downward 2.54 mm during the 16th 63 μs period. The same process is sequentially performed repeatedly for the 2nd, 3rd, . . . , and 15th linear thermionic cathodes, thus completing the scanning of one field. The interlaced scanning of the next field is accomplished by superimposing on the vertical deflection signal voltage a bias voltage corresponding to a deflection of 5.08/32 mm and in this way the vertical scanning is accomplished to produce a picture for one frame.

We claim:

1. A picture display device comprising:

a plurality of linear thermionic cathodes;

partition means for separating said linear thermionic cathodes from one another;

electron beam extraction electrode means having a plurality of apertures formed therethrough in correspondence with said thermionic cathodes in the axial direction thereof for producing electron beams;

electron beam control electrode means comprising a plurality of electrodes including a plurality of apertures each thereof being coaxial with corresponding one of said apertures formed in said electron beam extraction electrode means, said control electrodes being arranged substantially perpendicular to said thermionic cathodes;

deflection electrode means for deflecting said electron beams;

acceleration electrode means for accelerating said electron beams; [and]

display means coated with a fluorescent substance which emits light when hit by said electron beams and including a display screen, at least said display screen being housed in a transparent glass container[.]; *and*

*selective driving means for selectively driving said linear thermionic cathodes to emit an electron beam in cooperation with said electron beam extraction means.*

2. A picture display device as set forth in claim 1, wherein said partition means comprises a rear electrode having an opening on one of the sides thereof, wherein said linear thermionic cathodes are disposed inside said rear electrode to extend in the axial direction thereof, and wherein said electron beam extraction electrode means is disposed on said opening side of said rear electrode and is insulated therefrom.

3. A picture display device as set forth in claim 1, wherein said partition means is in the form of a C-shaped or U-shaped cylindrical or parallel flat plate means.

4. A picture display device as set forth in claim 1, wherein said linear thermionic cathodes are stretched substantially parallel to said partition means to extend through substantially the central portion thereof.

5. A picture display device as set forth in claim 1, wherein the apertures through said electron beam extraction electrode means are arranged into a plurality of rows each thereof being extended along associated one of said linear thermionic cathodes.

6. A picture display device as set forth in claim 1, wherein the spacing between said electron beam extraction electrode means and said electron beam control electrode means is selected to be smaller than the spacing between said plurality of apertures formed in said electron beam extraction electrode means.

7. A picture display device as set forth in claim 1 further comprising acceleration electrode means disposed in an electron beam acceleration space defined between said deflection electrode means and said display means coated with a fluorescent substance, said acceleration electrode means including a plurality of electrodes having the same pitch as the electrode intervals of said cathode partition means.

8. A picture display device as set forth in claim 1, wherein said electron beam deflection electrode means comprises first deflection electrode means for vertically deflecting said electron beams and second deflection electrode means for horizontally deflecting said electron beams.

9. A picture display device as set forth in claim 1, wherein said partition means is made of an electrically conductive material, and wherein a voltage of zero or negative potential with respect to said linear thermionic cathodes is applied to said partition means.

10. A picture display device as set forth in claim 1[further comprising], *wherein said selective driving means comprises* pulse signal generating means connected to one end of said linear thermionic cathodes, and a power source connected to the other end of each of said linear thermionic cathodes through a diode to heat the same, whereby a pulse signal voltage is applied from said pulse signal generating means to each of said linear thermionic cathodes in a manner that a reverse current flows in said diode and a potential difference between the ends of each said linear thermionic cathode is temporarily reduced to nearly zero.

11. A picture display device as set forth in claim 1, wherein the number of said linear thermionic cathodes is n, and wherein a pulse signal voltage having a time width corresponding to the number of scanning lines obtained by dividing the number of vertical scanning lines for said display screen by said n, is applied sequentially to said n linear thermionic cathodes.

12. A picture display device as set forth in claim 1, wherein the number of said linear thermionic cathodes is n, wherein m (an integer) represents a quotient obtained by dividing the number of vertical scanning lines for said display screen by said n, and wherein a pulse signal voltage varying in m steps is applied to said first deflection electrode means for deflecting said electron beams.

*13. A picture display device comprising;*

*a plurality of linear thermionic cathodes;*

*electron beam extraction means for extracting electron beams from said thermionic cathodes;*

*electron beam control electrode means comprising a plurality of electrodes being elongated in the direction perpendicular to said thermionic cathodes for controlling the electron beams;*

*deflection electrode means for deflecting said electron beams;*

*acceleration electrode means for accelerating said electron beams;*

*display means coated with a fluorescent substance which emits light when hit by said electron beams and including a display screen, at least said display screen being housed in a transparent container; and*

*selective driving means for selectively driving said linear thermionic cathodes to emit an electron beam in cooperation with said electron beam extraction means.*

*14. A picture display device as set forth in claim 13, wherein said deflection electrode means deflects said electron beams in the direction perpendicular to said thermionic cathodes.*

*15. A picture display device as set forth in claim 13, wherein said selective driving means comprises pulse signal generating means connected to one end of said linear thermionic cathodes, and a power source connected to the other end of each of said linear thermionic cathodes through a diode to heat the same, whereby a pulse signal voltage is applied from said pulse signal generating means to each of said linear thermionic cathodes in a manner that a reverse current flows in said diode and a potential difference between the ends of each said linear thermionic cathode is temporarily reduced to nearly zero.*

*16. A picture display device comprising;*

*a plurality of linear thermionic cathodes;*

*rear electrode means provided behind said thermionic cathodes;*

*electron beam extraction electrode means having a plurality of apertures formed therethrough along said thermionic cathodes for producing in cooperation with said rear electrode means electron beams which converge to flow through said apertures;*

*electron beam control electrode means for controlling the electron beams from a part of said thermionic cathodes along each of those electrodes;*

*deflection electrode means for deflecting said electron beams;*

*acceleration electrode means for accelerating said electron beams; and*

*display means coated with a fluorescent substance which emits light when hit by said electron beams and including a display screen, at least said display screen being housed in a transparent container.*

*17. A picture display device as set forth in claim 16, wherein said deflection electrode beam means deflects said electron beams in the direction perpendicular to said thermionic cathodes.*

*18. A picture display device as set forth in claim 16, further comprising pulse signal generating means connected to one end of said linear thermionic cathodes, and a power source connected to the other end of each of said linear thermionic cathodes through a diode to heat the same, whereby a pulse signal voltage is applied from said pulse signal generating means to each of said linear thermionic cathodes in a manner that a reverse current flows in said diode and a potential difference between the ends of each said linear thermionic cathode is temporarily reduced to nearly zero.*

*19. A picture display device comprising;*

*a plurality of linear thermionic cathodes;*

*rear electrode means provided behind said thermionic cathodes;*

*electron beam extraction electrode means having a plurality of apertures formed therethrough along said thermionic cathodes for forming an electron extracting field in cooperation with said rear electrode means;*

*electron beam control electrode means said electron extracting field causing convergence of electron beams to pass through said apertures comprising a plurality of electrodes being elongated in the direction perpendicular to said thermionic cathodes for controlling electron beams from a part of said thermionic cathodes along each of those electrodes;*

*deflection electrode means for deflecting said electron beams;*

*acceleration electrode means for accelerating said electron beams; and*

*display means coated with a fluorescent substance which emits light when hit by said electron beams and including a display screen, at least said display screen being housed in a transparent container.*

* * * * *